United States Patent
Rowe

(10) Patent No.: US 11,920,330 B2
(45) Date of Patent: Mar. 5, 2024

(54) METHOD OF MANUFACTURING A TAP BODY

(71) Applicant: Greg Rowe Limited, Norwich (GB)

(72) Inventor: Gregory Norman Rowe, Norwich (GB)

(73) Assignee: Gregory Rowe Limited, Norwich (GB)

(*) Notice: Subject to any disclaimer, the term of this patent is extended or adjusted under 35 U.S.C. 154(b) by 723 days.

(21) Appl. No.: 16/976,562

(22) PCT Filed: Mar. 1, 2019

(86) PCT No.: PCT/GB2019/050584
§ 371 (c)(1),
(2) Date: Aug. 28, 2020

(87) PCT Pub. No.: WO2019/166827
PCT Pub. Date: Sep. 6, 2019

(65) Prior Publication Data
US 2021/0047813 A1 Feb. 18, 2021

(30) Foreign Application Priority Data
Mar. 2, 2018 (GB) ...................................... 1803403

(51) Int. Cl.
*E03C 1/04* (2006.01)
*F16K 11/00* (2006.01)
(Continued)

(52) U.S. Cl.
CPC .......... *E03C 1/0411* (2013.01); *E03C 1/0404* (2013.01); *F16K 11/207* (2013.01); *F16K 19/006* (2013.01); *F16K 27/045* (2013.01)

(58) Field of Classification Search
CPC .... E03C 1/0411; E03C 1/0404; F16K 11/207; F16K 19/006; F16K 27/045; F16K 27/044
(Continued)

(56) References Cited

U.S. PATENT DOCUMENTS

| | | | |
|---|---|---|---|
| 4,513,769 A | 4/1985 | Purcell | |
| 4,649,958 A | 3/1987 | Purcell | |

(Continued)

FOREIGN PATENT DOCUMENTS

| | | |
|---|---|---|
| CN | 2578629 Y | 10/2003 |
| CN | 2 818 968 Y | 9/2006 |

(Continued)

OTHER PUBLICATIONS

Chinese Office Action dated Feb. 28, 2022 in Counterpart Chinese Patent Application No. 201980016034.0 (6 pages in English and 12 pages in Chinese).

(Continued)

*Primary Examiner* — Lori L Baker
(74) *Attorney, Agent, or Firm* — NSIP Law

(57) ABSTRACT

A method of manufacturing a tap body and a tap is disclosed together with a tap body and a tap made by the process. The present techniques may relate to domestic water taps or faucet. According to the method, first and second hollow body parts are made. The first body part comprises a first pair of apertures. The second body part comprises opposed open ends. The second body part also comprises at least one aperture between the opposed open ends. The method further comprises the steps of inserting the first body part into the at least one aperture on the second body part to make a tap outer body, and aligning the first pair of apertures of the first body part with the opposed open ends to define a channel through the tap outer body.

22 Claims, 13 Drawing Sheets

(51) Int. Cl.
*F16K 11/20* (2006.01)
*F16K 27/04* (2006.01)

(58) Field of Classification Search
USPC .................................................... 4/675–678
See application file for complete search history.

(56) References Cited

U.S. PATENT DOCUMENTS

| 2007/0056641 | A1 | 3/2007 | Hsiao |
| 2011/0303305 | A1* | 12/2011 | Chen ............... E03C 1/041 |
| | | | 137/897 |
| 2014/0224362 | A1 | 8/2014 | Shih |

FOREIGN PATENT DOCUMENTS

| CN | 201121752 Y | 9/2008 |
| CN | 201221637 Y | 4/2009 |
| CN | 103624501 A | 3/2014 |
| EP | 1 749 898 A2 | 2/2007 |
| EP | 2 672 027 A1 | 12/2013 |
| EP | 2 990 703 A1 | 3/2016 |
| WO | WO 2008/104517 A1 | 9/2008 |
| WO | WO 2017/042586 A1 | 3/2017 |

OTHER PUBLICATIONS

International Search Report dated Jun. 25, 2019 in counterpart International Patent Application No. PCT/GB2019/050584 (5 pages in English).
Written Opinion of the International Searching Authority dated Jun. 25, 2019 in counterpart International Patent Application No. PCT/GB2019/050584 (8 pages in English).
Australian Office Action dated Dec. 14, 2023, in counterpart Australian Patent Application No. 2019227857 (3 pages).

* cited by examiner

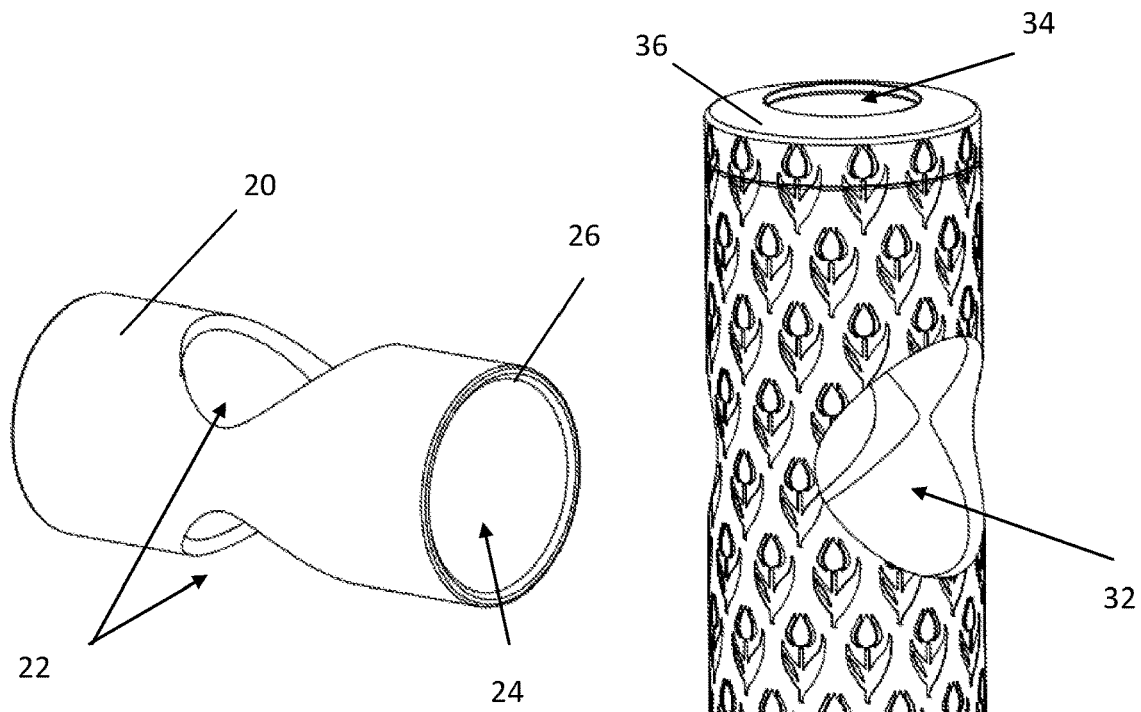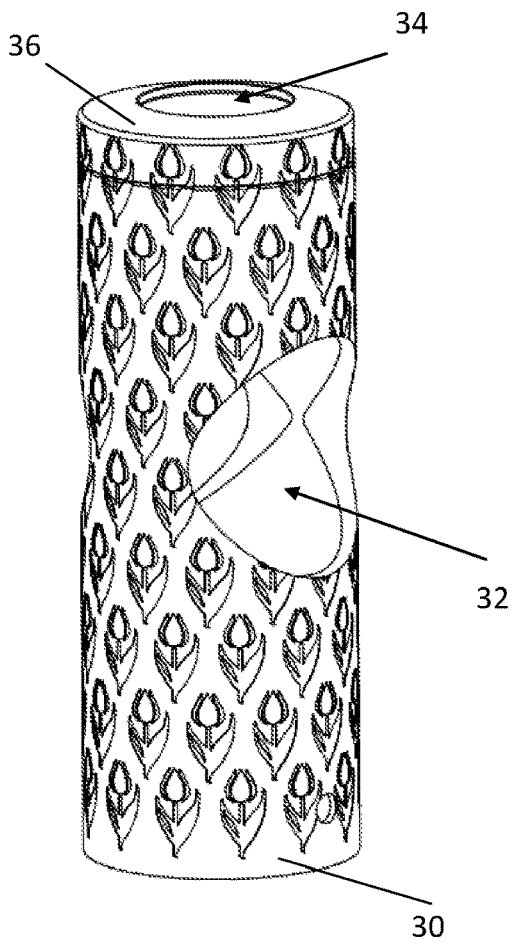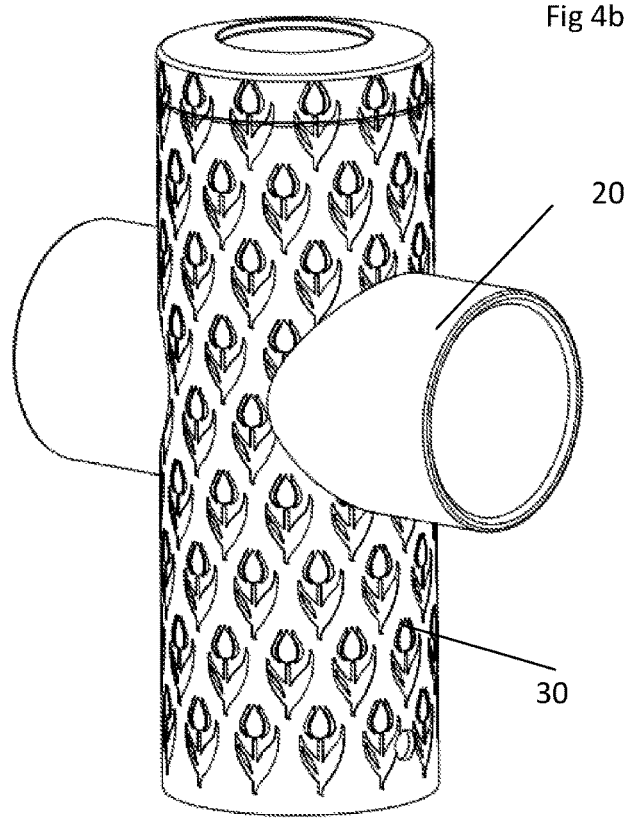
Fig 4a
Fig 4b
Fig 4c

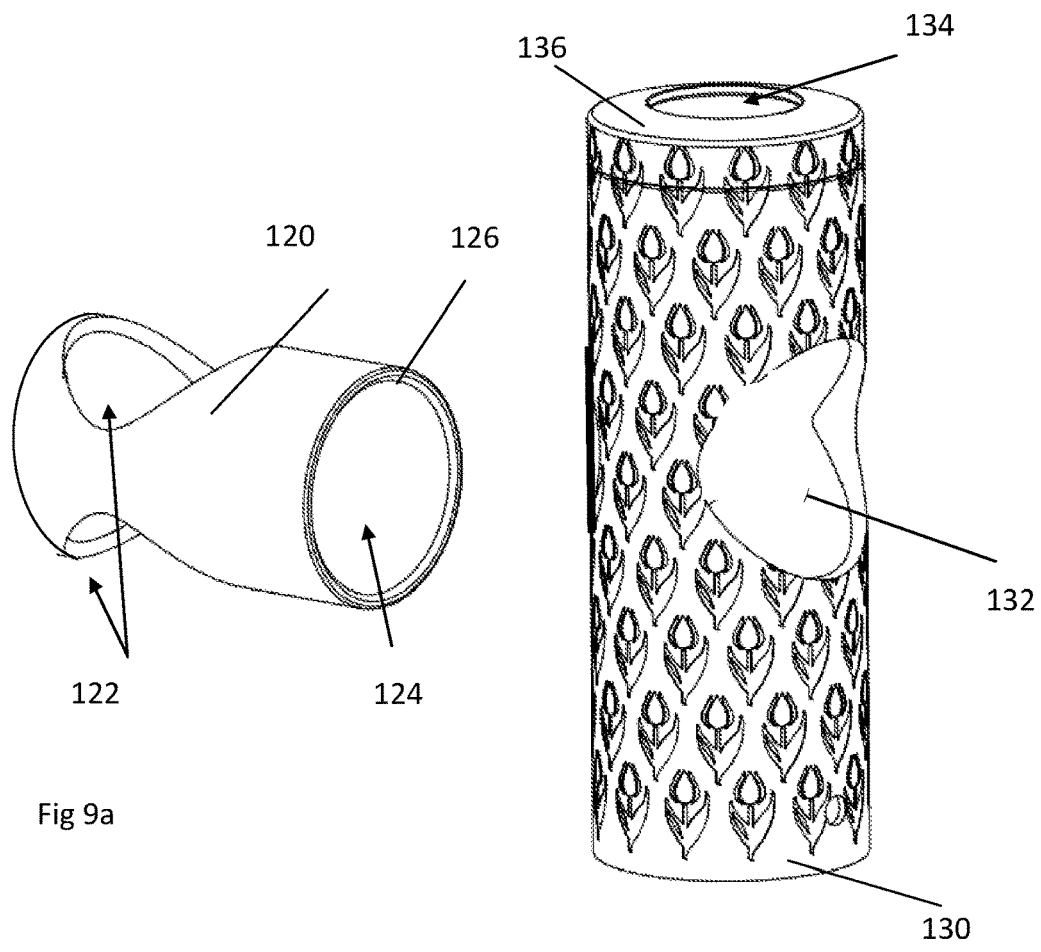
Fig 9a
Fig 9b
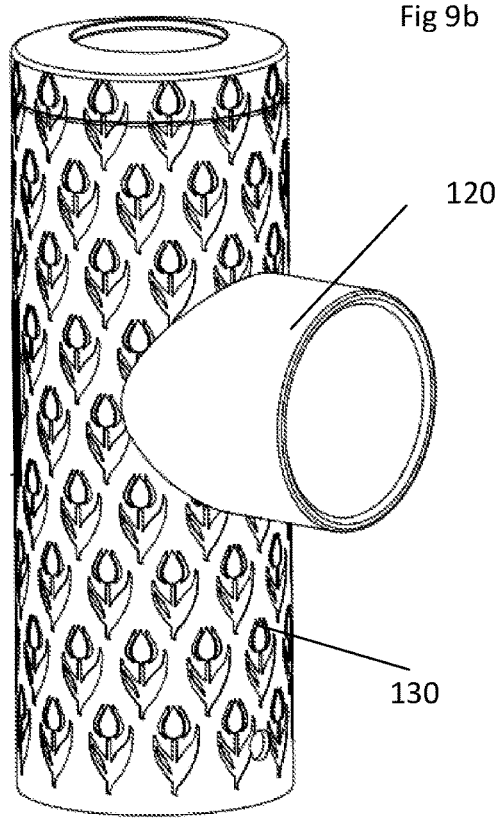
Fig 9c

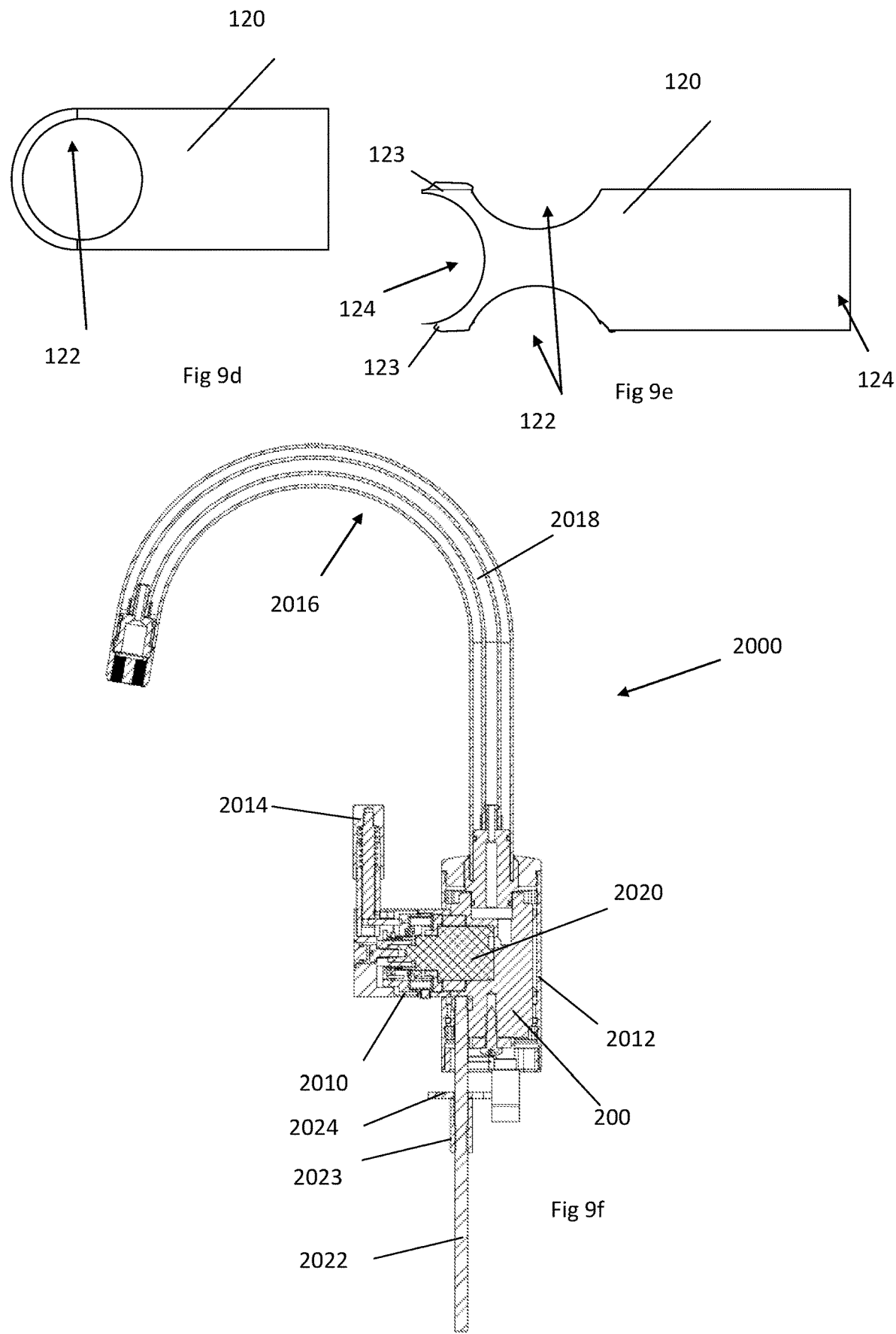

METHOD OF MANUFACTURING A TAP BODY

CROSS REFERENCE TO RELATED APPLICATIONS

This application is a U.S. National Stage Application of International Application No. PCT/GB2019/050584, filed on Mar. 1, 2019, which claims the benefit under 35 USC 119(a) and 365(b) of British Patent Application No. 1803403.3, filed on Mar. 2, 2018, in the United Kingdom Intellectual Property Office, the entire disclosure of which is incorporated herein by reference for all purposes.

FIELD

The present invention relates to a method of manufacturing a tap body and a tap including the tap body, particularly in a domestic water tap or faucet and a tap body and a tap made by the process.

BACKGROUND

Various types of taps are known, including single lever or dual lever taps which deliver a mixture of hot and cold water from mains sources as well as dual lever taps which deliver water from a plurality of sources, including mains sources, filtered water sources, near boiling or boiling water sources or carbonated water sources.

The taps comprise valves to control the mixing and/or dispensing of water from the different water sources. As described in EP2990703 to the present applicant, the tap body comprises a first tap body part and a partially hollow generally cylindrical second tap body part. The first tap body part is configured to receive a valve in each of its opposed hollow ends. EP2990703 describes that the use of a tap body made from at least two tap body parts differs from the prior art arrangements where the whole tap body is cast or moulded as a single item or block. In WO2017/042586 to the present applicant, the tap body has a generally hollow housing to house two valves which are spaced from the exterior wall of the housing.

The applicant has recognised the need for an alternative method of manufacturing a tap body.

SUMMARY

According to the invention, there is provided a method of manufacturing a tap body and a tap body as defined in the independent claims. Further features of the invention are described in the dependent claims.

We describe a method of manufacturing a tap outer body comprising making first and second hollow body parts, wherein the first body part comprises a first pair of apertures and the second body part comprises opposed open ends and at least one aperture between the opposed open ends; inserting the first body part into the at least one aperture on the second body part to make a tap outer body; and aligning the first pair of apertures of the first body part with the opposed open ends to define a channel through the tap outer body.

The first and second body parts are preferably each of unitary construction, i.e. both are single pieces. In this way, the tap body is separated into two parts, which by use of the apertures are relatively easily assembled together and create a generally stable tap body. The second body part may be connectable to a spout, for example, via one of the opposed open ends and thus in use, the second body part may be generally vertically mounted. By inserting the first body part into a second body part of unitary construction, the stability of the two parts relative to one another may be increased.

The insertion of the first body part also means that the whole outer surface of the second body part is visible, in other words, when the second body part is connectable to a spout, the vertical portion of the tap body is wholly visible. The method may further comprise patterning at least one or both of the first and second body parts. The separation of the tap body into two parts means that including patterning is simplified.

The patterning may comprise patterning at least part of the outer surface of the second body part. For example, the patterning may comprise repeatedly patterning a design which may be a single shape, e.g. a tulip or comprise a plurality of shapes. The repeated patterning may comprise defining an array or matrix of designs having a plurality of rows each having a plurality of copies of the design. The patterning may be done using any suitable technique which may depend on the material of the body part being patterned, e.g. laser etching may be suitable for materials such as stainless steel or chrome. The patterning may be done before the inserting step. In this way, an intricate design may be patterned onto the body part.

Making the first and second body parts may be done using any suitable technique. Each part may be made using the same or different method. For example, each tube may be cast or moulded or cut from an appropriate width of pipe or solid rod. Suitable materials include metals which are approved for use in a domestic setting such as stainless steel, aluminium, zinc or brass. A coating or plating may be applied to the first and second body parts after manufacture. The coating may be suitable for patterning, e.g. chrome plating which may be etched to define the pattern. The apertures may be created at the same time as the tube or may be cut, using any suitable technique such as milling or the like, after the tube is made.

Making the first body part may comprise creating the first pair of apertures approximately mid-way along the first body part. The first body part may have a pair of opposed open ends and the first pair of apertures may be approximately centrally located relative to the opposed open ends. In this way, approximately the same portion of the first body part projects either side of the second body part once inserted and the first pair of apertures has been aligned to create a channel. Thus, the combination of the first and second body parts provides a symmetrical shape which may be more stable than a non-symmetrical shape.

Alternatively, making the first body part may comprise creating the first pair of apertures adjacent one end of the first body part. In this way, the first body part only projects from one side of the second body part. Making the first body part may comprise shaping the adjacent end to match an inner surface of the second body part, e.g. both may have complementary curvature. The method may further comprise inserting the first body part so that the shaped end abuts the inner surface of the second body part.

Each aperture in the first pair of apertures may have a width which is approximately equal to a width of the second body part. Thus, when the first pair of apertures is aligned with the opposed ends of the second body part, a channel is defined through the tap body with minimal interruption from the first body part.

The at least one aperture in the second body part may have a width which is approximately equal to a width of the first body part. The first body part may be a relatively loose fit within the second body part to secure the two parts together without damaging either part. The fit may thus be a transitional or a loose fit. The at least one aperture may comprise a second pair of apertures. The second pair of apertures may be radially or horizontally aligned with each other whereby after insertion, the first body part is substantially at right angles to the second body part. This may be achieved by locating the second pair of apertures at the same position along the length of the second body part.

The method may further comprise fitting a cap to the opposed end of the second body part which is connectable to a spout of a tap. The cap may assist in fitting the spout. The method may further comprise patterning the cap, e.g. to match any patterning on the second body part. To avoid alignment issues within the applied patterning, the cap may first be fitted on the second body part and then patterning may be applied to both parts.

We also describe a method of manufacturing a tap outer body comprising making first and second hollow body parts, wherein the second body part comprises at least one aperture; patterning at least one of the first and second hollow body parts; and inserting the first body part into the at least one aperture on the second body part to make a tap outer body. The method is compatible with the steps and detail mentioned above and below.

The method may be used to manufacture a tap outer body for a tap. We also describe that the method of manufacturing the tap outer body may be part of the process for manufacturing a tap incorporating the tap outer body.

We also describe a tap outer body comprising a first one-piece hollow body part comprising a first pair of apertures; and a second one-piece hollow body part comprising opposed open ends and at least one aperture between the opposed open ends; wherein the first body part is located in the at least one aperture on the second body part; and wherein the first pair of apertures of the first body part are aligned with the opposed open ends on the second body part to define a channel through the tap outer body.

One of the opposed open ends of the second one-piece hollow body part may be connectable to a spout of a tap whereby the second hollow body part is generally vertically mounted in use. The first pair of apertures may be approximately mid-way along the first body part or may be adjacent one end of the first body part. The adjacent end may be shaped to match an inner surface of the second body part. Each aperture may have a width which is approximately equal to a width of the second body part. The at least one aperture on the second body part may have a width which is approximately equal to a width of the first body part. The at least one aperture may be a second pair of apertures and the second pair of apertures may be aligned with one another, e.g. to facilitate insertion of the first body part. The first body part may be set substantially at right angles to the second body part.

At least one of or both of the first and second body parts may be patterned. The patterning may be across substantially all (e.g. 80%) of the outer surface or may be across part of the surface.

The tap outer body may further comprise a cap. The cap may be used to assist the attachment of a spout.

We also describe a tap comprising a tap outer body as described above. The tap may comprise a spout which is fitted through the cap. The tap may further comprise an inner body, e.g. of a thermally insulating material, and the inner body may be configured to ensure that water flows only through the inner body. The tap may further comprise one or more valves and one or more activation mechanisms for the valves.

BRIEF DESCRIPTION OF DRAWINGS

Further features and advantages of the invention will become apparent from the following description of preferred embodiments of the invention, given by way of example only, which is made with reference to the accompanying drawings.

FIG. 2a is a front view of a tap incorporating first and second components according to the invention;
FIG. 2b is a perspective view of the tap of FIG. 2a;
FIG. 3a is a flow chart of a method of manufacture of the tap body of the tap of FIG. 2a;
FIG. 3b is a flow chart of a method of assembly for a tap using the tap body manufacture in FIG. 3a;
FIG. 4a is a perspective view of a first component used in the tap of FIG. 2a;
FIG. 4b is a perspective view of a second component used in the tap of FIG. 2a;
FIG. 4c is a perspective view of the first and second components assembled according to the method;
FIG. 6a is a cross-section of a similar tap to that of FIG. 2a;
FIG. 7a is an exploded view of an inner body for use in the tap of FIG. 2a;
FIG. 7b is a perspective view of the inner body of FIG. 7a;
FIG. 7c is a plan view of an insert used with the inner body of FIG. 7a;
FIG. 7d is a perspective view of the assembled components of FIG. 7a;
FIG. 9a is a perspective view of a first component used in the tap of FIG. 9f;
FIG. 9b is a perspective view of a second component used in the tap of FIG. 9f;
FIG. 9c is a perspective view of the first and second components assembled according to the method;
FIGS. 9d and 9e are plan and side views of the first component of FIG. 9a;
and
FIG. 9f is a cross-sectional view of an alternative tap incorporating first and second components shown in FIGS. 9a to 9e.

DESCRIPTION OF EMBODIMENTS

Figure 1:
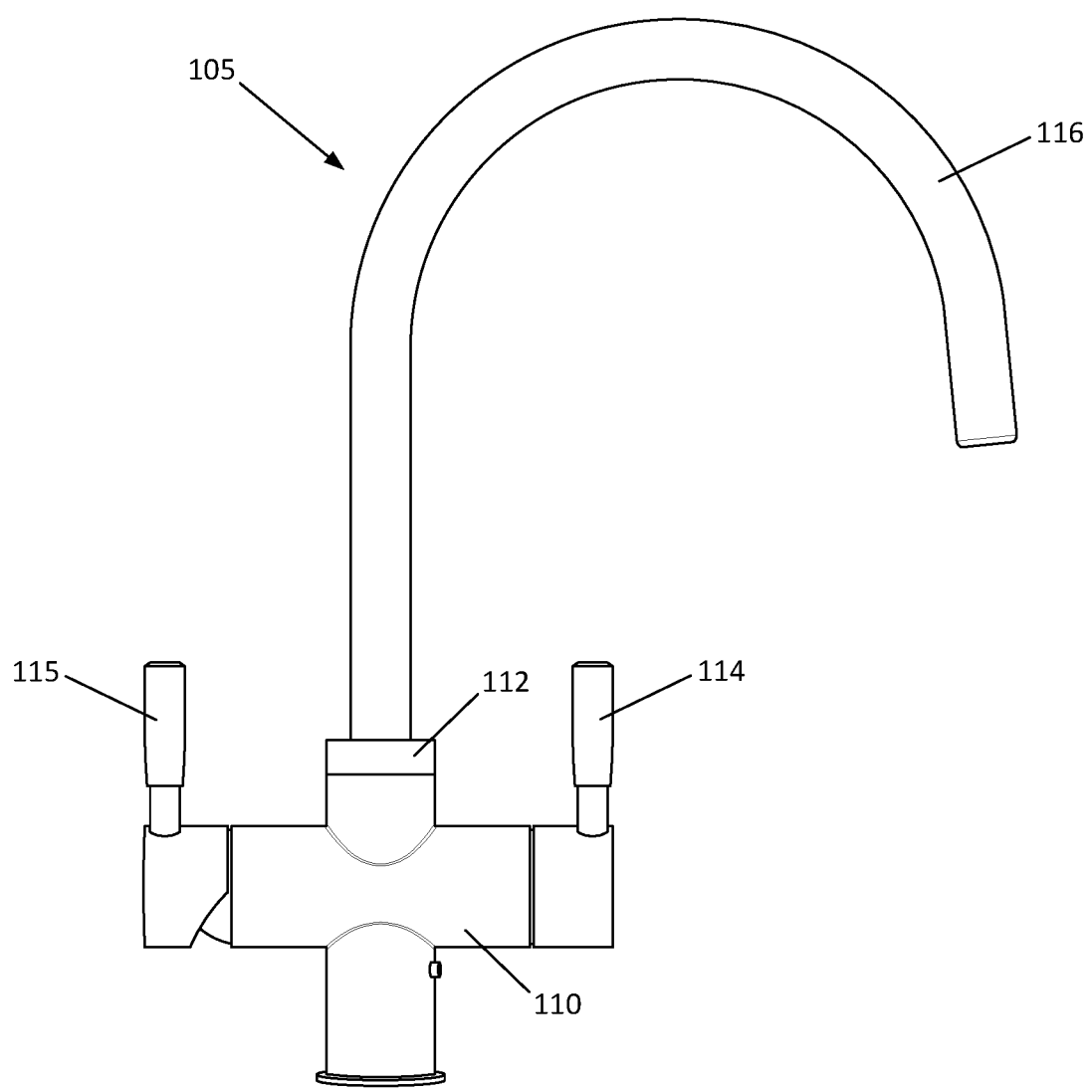
FIG. 1 is a front view of a known tap.

FIG. 1 shows a tap 105 having a tap body which comprises a first body piece 110 and a second body piece 112 which are arranged substantially at right angles to one another. The second body piece 112 comprises two parts; an upper part which is secured to the upper part of the first body piece 110 and a lower part which is secured to the lower part of the first body piece 110. When installed at a sink unit (not shown) or other work surface, the second body piece 112 will typically extend substantially vertically with respect to the work surface. Disadvantages of such a tap include the difficulty in accurately aligning the first and second parts of the second outer piece 112 with the first outer body piece 110 which may result in the first outer body piece 110 being unstable and hence moveable relative to the second body piece 112.

The tap 105 further comprises a first operating mechanism 114 which is operatively connected to a first valve to dispense water from a first source(s). There is also a second operating mechanism 115 operatively connected to a second valve to dispense water from a second source(s). The tap 105 further comprises a cylindrical spout 116 which is connected to and extends from the second body piece 112.

Figures 2A, 2B:
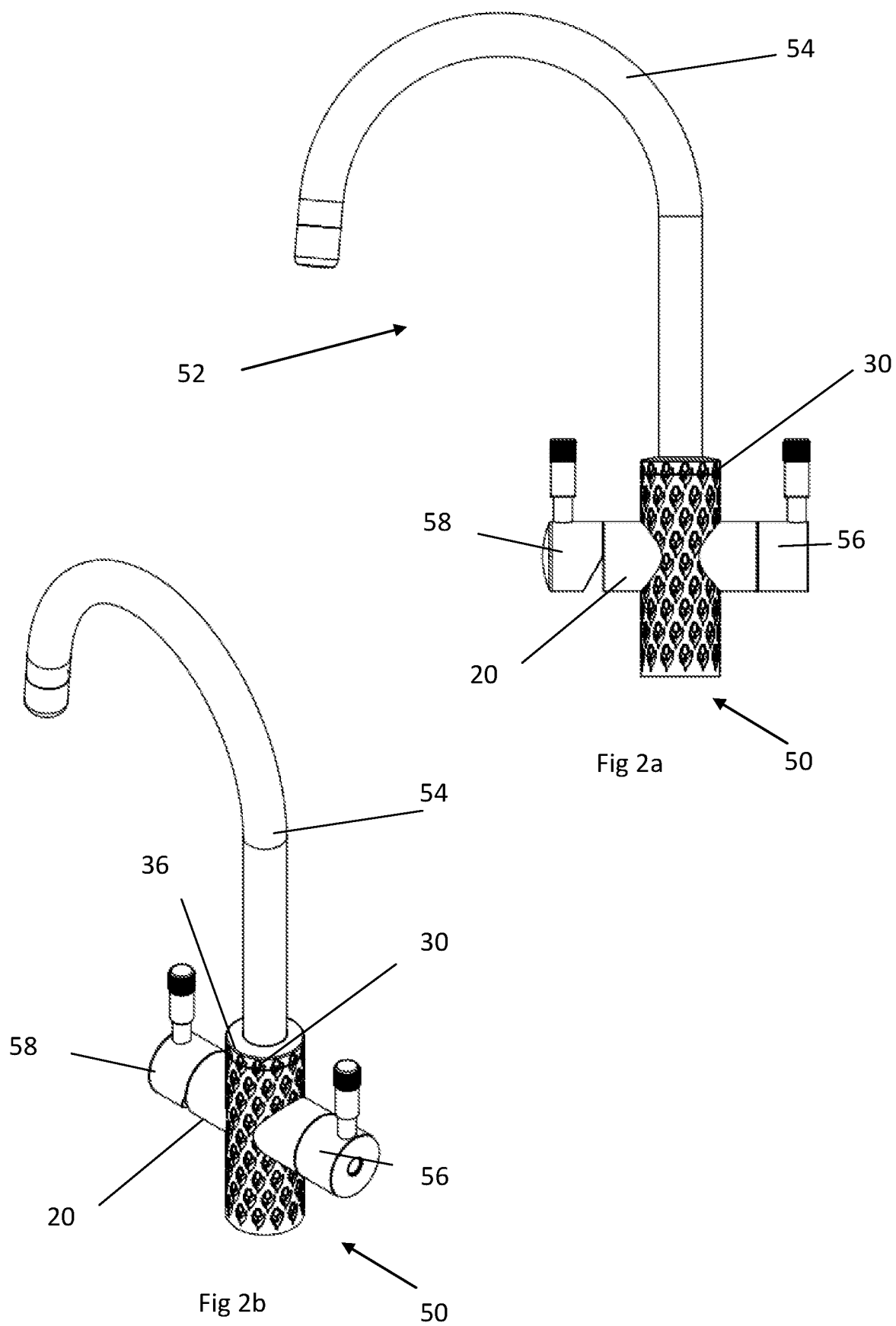

FIGS. 2a and 2b show an alternative outer tap body 50 which is part of a tap 52. The outer tap body 50 comprises a first body part 20 and a second body part 30 which are described in more detail below. In contrast to the arrangement of FIG. 1, the first body part 20 which is generally horizontal is received within the second body part 30 which is generally vertical. Moreover, both the first and second body parts are one-piece components. A spout 54 is connected through an aperture in a cap 36 on the second body part 30. Two handles 56, 58 have been fitted to the first body part 20; one at each end. The first handle 56 may be used to dispense water from a first source(s), e.g. boiling filtered water or cold filtered water, and the second handle 58 may be used to operate a mixer valve to dispense water from a second source(s), e.g. hot, cold or a mixture of hot and cold mains water. Water may be dispensed separately or simultaneously from both the first and second sources.

Figure 3A:
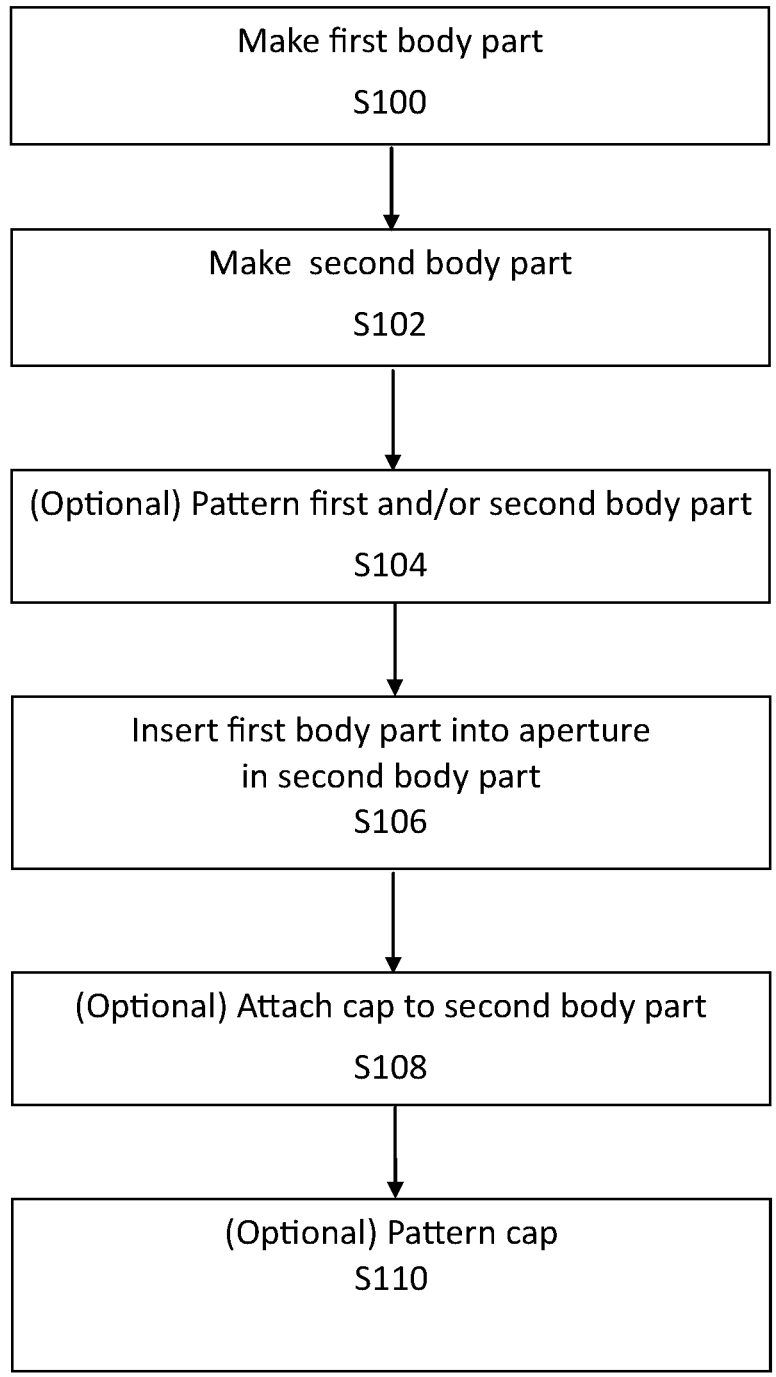

FIG. 3a shows the steps in manufacturing a component for a tap of FIG. 2a. The component is the housing or outer body shown in FIG. 2a. The outer body houses valves and other components which are used to connect the tap to a water source so that water can be dispensed from the tap. The housing is made from two separate body parts and thus the first steps in the method are to make the first body part S100 and to make the second body part S102. These are shown as two sequential steps but they could be performed simultaneously or in the other order.

As explained in more detail below, each of the first and second body parts is a generally cylindrical and hollow tube. The first body part has an opposed pair of apertures which are either generally centrally located on the tube or located towards one end of the tube. The second body part has at least one aperture and may have a pair of apertures. The at least one aperture or the pair of apertures may be approximately midway along the length of the tube. On either the first or second body part, where there is a pair of apertures, they are opposed to one another, i.e. they face each other and are thus equally spaced around a surface of the tube. Each part may be made using the same or different method. For example, each tube may be cast or moulded or cut from an appropriate width of pipe. The apertures may be created at the same time as the tube or may be cut, using any suitable technique such as milling or the like, after the tube is made. Any suitable material may be used, e.g. stainless steel or brass. A coating may also be applied as part of the manufacturing process.

Figure 8:
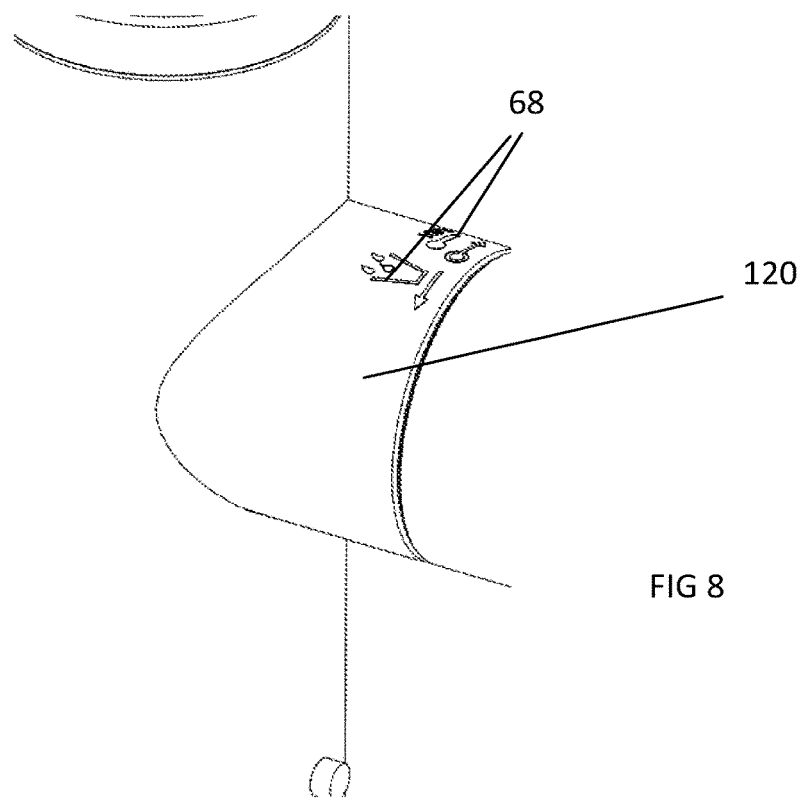
FIG. 8 is perspective view of another outer tap body.

After the first and second body parts are made, they may optionally be patterned using known techniques such as laser etching, as shown at step S104. For example, the first body part may be patterned with visual indicators to show which direction to turn the tap handle to dispense which type of water, for example as shown in FIG. 8. The second body part may be patterned on its outer surface to customize the external appearance of the housing. Screw threads or other connections may also be machined on the second body part for internal tap components which are housed within the two-piece housing.

Once any patterning is completed, the first body part is then inserted into the or both apertures in the second body part at step S106. When there are two apertures, the apertures are positioned and/or aligned with each other so that once the first body part is inserted into the second body part and the first and second body parts are substantially set at right angles to one another. When there is a single aperture, the aperture is also designed so that the first and second body parts are substantially set at right angles to one another.

The first body part is held within and is thus partly covered or obscured by the second body part. Accordingly, it is easier to pattern the first body part before it is inserted. Although, the second body part is wholly visible and could thus optionally be patterned after the two parts are connected, it may still be simpler to pattern the second body part before it receives the first body part. There is no risk of patterning the first body part mistakenly and it may also be possible to pattern a more continuous pattern across the entire surface of the second body part. Furthermore, once the parts are connected, it is possible to apply any further patterning continuously across both parts.

At step S108, a cap may be optionally fitted to the second body part, for example to facilitate connection of the upper open end of the second body part to the spout. If the second body part is patterned, as shown at step S110, the cap may be patterned to match the patterning on the second body part. The patterning may be added before the cap is fitted or after the cap is fitted as needed. The attachment of the cap may take place after the second body part has been made so that the patterning of the cap may take place at the same time as the patterning of the second body part. This may reduce alignment issues between the pattern on the second body part and the pattern on the cap. Thus, the order of steps shown in FIG. 3a is merely illustrative and can be altered as required.

The method of manufacture is thus relatively straightforward and is flexible to allow a variety of finishes to be applied to the housing.

Figure 3B:
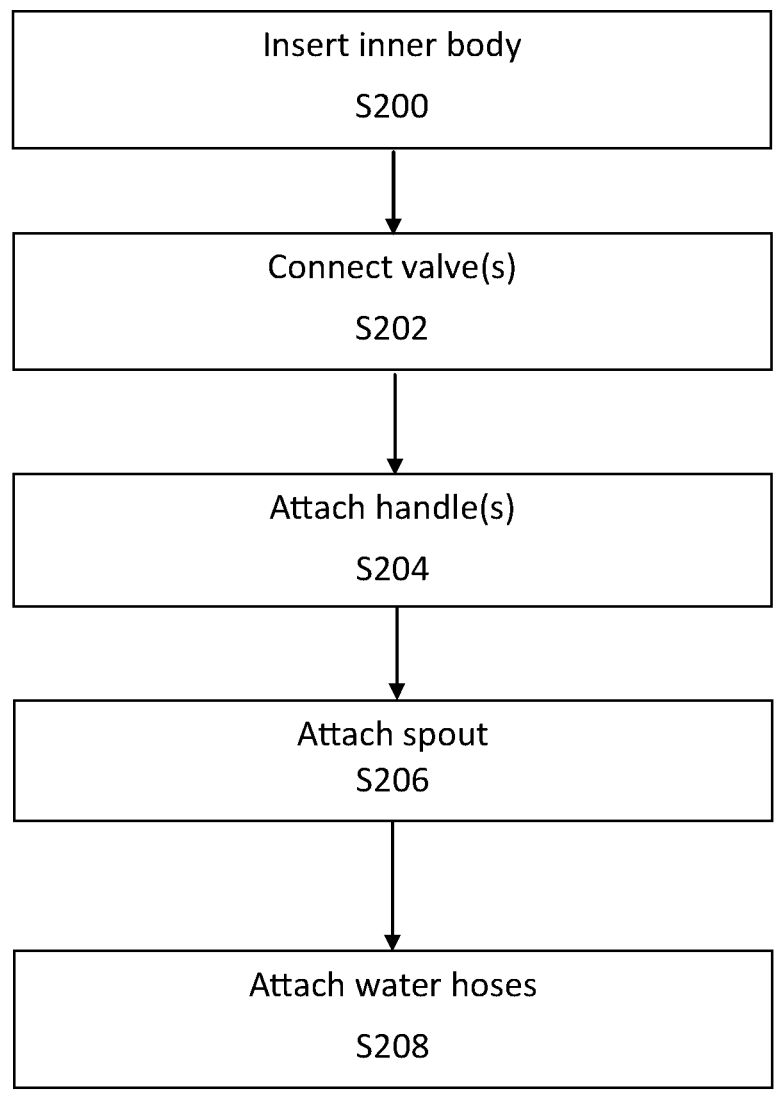

FIG. 3b shows the steps for making a tap using the housing manufactured as described in relation to FIG. 3a. The first step S200 is to insert an inner body such as the one shown below. The inner body connects to the valve(s) and spaces them away from the housing to reduce thermal transmission to the housing. The inner body may be made from a material having low thermal conductivity as described in UK application GB1717969.8 to the present applicant which is hereby incorporated by reference.

The valves are connected to the inner housing at step S202 and then handles are fitted to the housing to close the open ends of the first body part at step S204. The spout and water hoses which connect the tap, particularly the valves to the various water sources, are then connected at steps S206 and S208. It will be appreciated that the various tap components may be assembled in a different order. The housing may also be secured to a work surface before some or all of the other components are attached.

FIG. 4a shows a first body part 20 which may be manufactured in the process above. The first body part 20 is a generally cylindrical and hollow tube with opposed open ends 24. An opposed pair of apertures 22 are generally centrally located on the tube. Each aperture is generally circular with a diameter approximately equal to the diameter of the cylinder. At least one of the open ends 24 has a screw thread 26 around the open end which may be used to fit other components, e.g. a cover or handle boss for the tap.

FIG. 4b shows a second body part 30 which may be manufactured in the process above. The second body part 30 is a generally cylindrical and hollow tube with opposed open ends 34. An opposed pair of apertures 32 are generally centrally located on the tube. Each aperture is generally circular. An upper open end 34 is capped with a cap 36. The cap may be annular and may be a screw-fit on the second body part. The cap 36 assists in locating the spout within the second body part by locating the spout within an aperture in the cap 36.

FIG. 4c shows the first body part 20 of FIG. 4a inserted into the pair of apertures 32 on the second body part 30 of FIG. 4b. The two parts together make an outer tap body having a cross or cruciform shape with the first body part 20 generally at right angles to the second body part 30. Once inserted, the apertures on the first body part 20 are aligned with the open ends of the second body part 30 so that there is a continuous channel through the first and second body parts. The diameter of each aperture of the second body part is thus approximately equal in size to the diameter of the first body part.

The diameter of each aperture on the first body part is approximately equal in size to the diameter of the second body part so that the second body part fits within the apertures and thus the two parts are secured to one another without damaging one another. When the housing is secured to a work surface, the first body part is generally horizontal, i.e. parallel to the work surface, and the second body part is generally vertical, i.e. at right angles to the work surface. The use of two single piece body parts simplifies the manufacturing process relative to that of the tap body shown in FIG. 1. The insertion of the first body part in the second body part may also result in a more stable construction. However, it will be appreciated that the second body part may be inserted into the first body part to connect the two parts together. Whichever way the two parts are connected together, one part, e.g. the second body part, partially obscures part of the other part, e.g. the first body part as shown, and thus the overall appearance of the outer tap body may be enhanced by the patterning on the fully visible part, e.g. the second body part 30. It will also be appreciated that the cylindrical geometry of the two parts is merely illustrative and other suitable shapes may be used provided the apertures are suitably shaped to match.

Figure 5A:
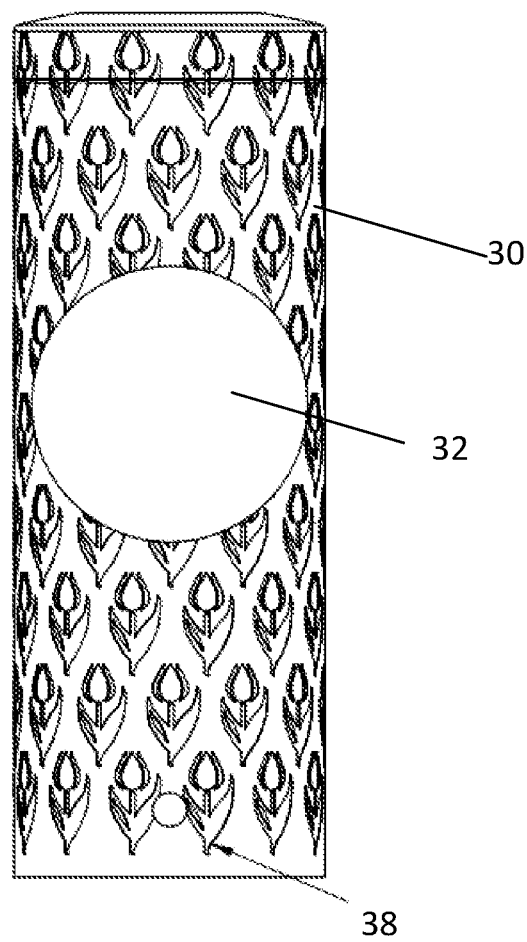
FIG. 5a is a side view of the second component of FIG. 4b.
Figure 5B:
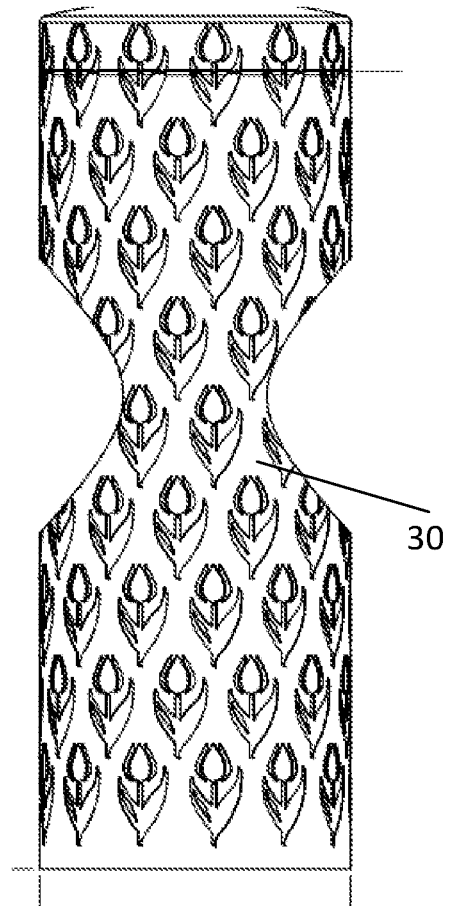
FIG. 5b is a front view of the second component of FIG. 4b.

FIGS. 5a and 5b show further detail of the second body part 30. As shown in FIG. 5a, each aperture 32 has a generally circular shape when viewed from the side. Each aperture has a diameter which is approximately equal to the diameter of the cylinder, for example in the range 45 to 50 mm, and thus significantly greater than the thickness of the material of the tube which is in the range of 5 to 10 mm. Accordingly, as shown in FIG. 5b, when viewed from the side, the apertures effectively create indentations into opposed sides of the tube. In the example shown, a single shape 38 of a tulip is repeatedly patterned on an external surface of the second body part. The shape is repeated eleven times on each row and there are nine rows forming a matrix of the same shape which covers the whole of the second body part. In this example, each row is offset from an adjacent row so that the shapes in every other row are vertically aligned with one another. In this way, a high level of detail may be produced on the body part and this detail is consistent across the surface of the body part. It will be appreciated that this matrix of shapes is merely indicative and different shapes and arrangements of shapes may be used. Furthermore, it will be appreciated that the patterning may extend over the whole surface as shown or only over part of the surface. The cap is also patterned to match the patterning on the second body part, for example the heads of the tulips are patterned on the cap and the stems of the tulips are patterned on the second body part.

Figure 6A:
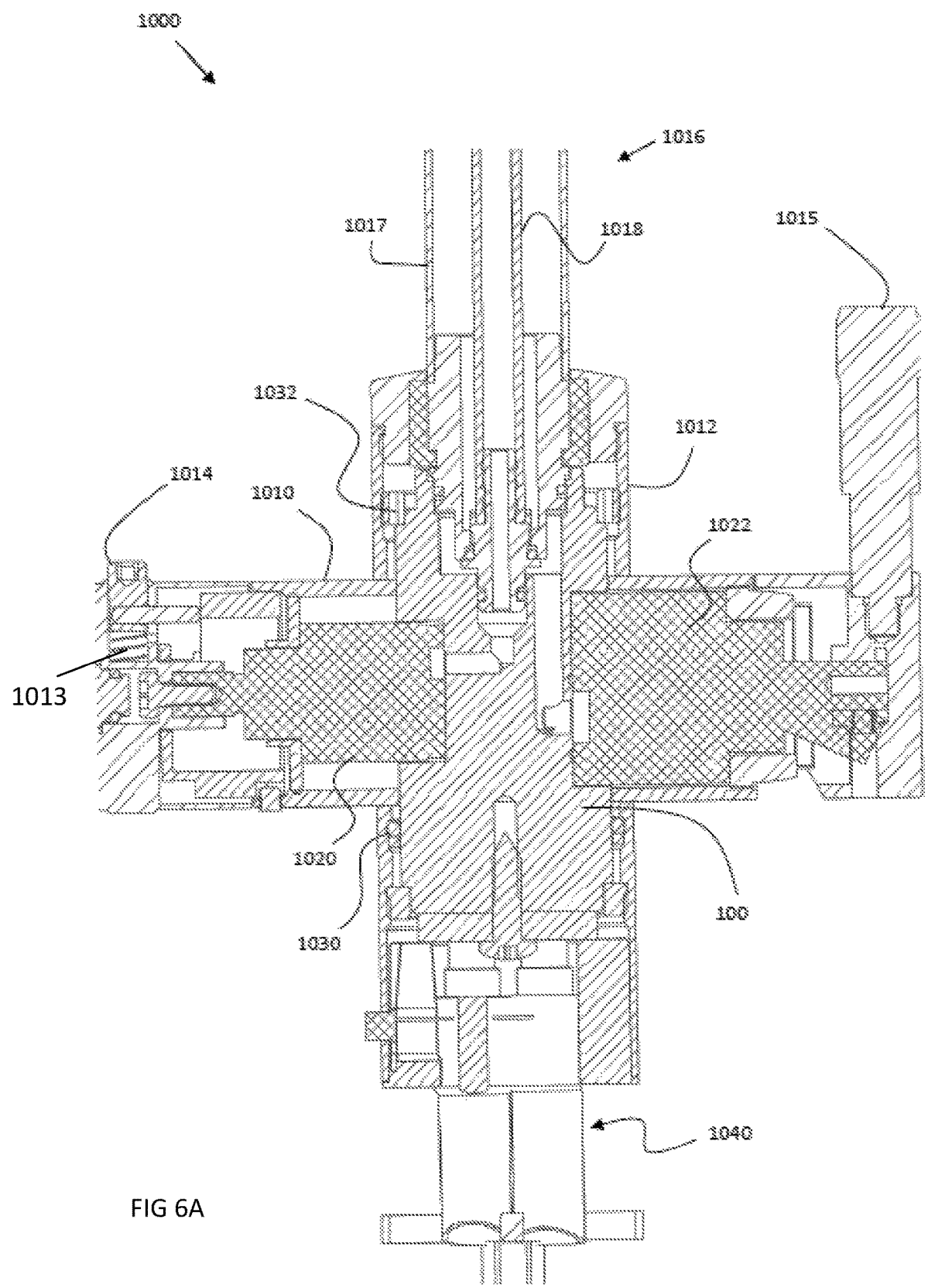
Figure 6B:
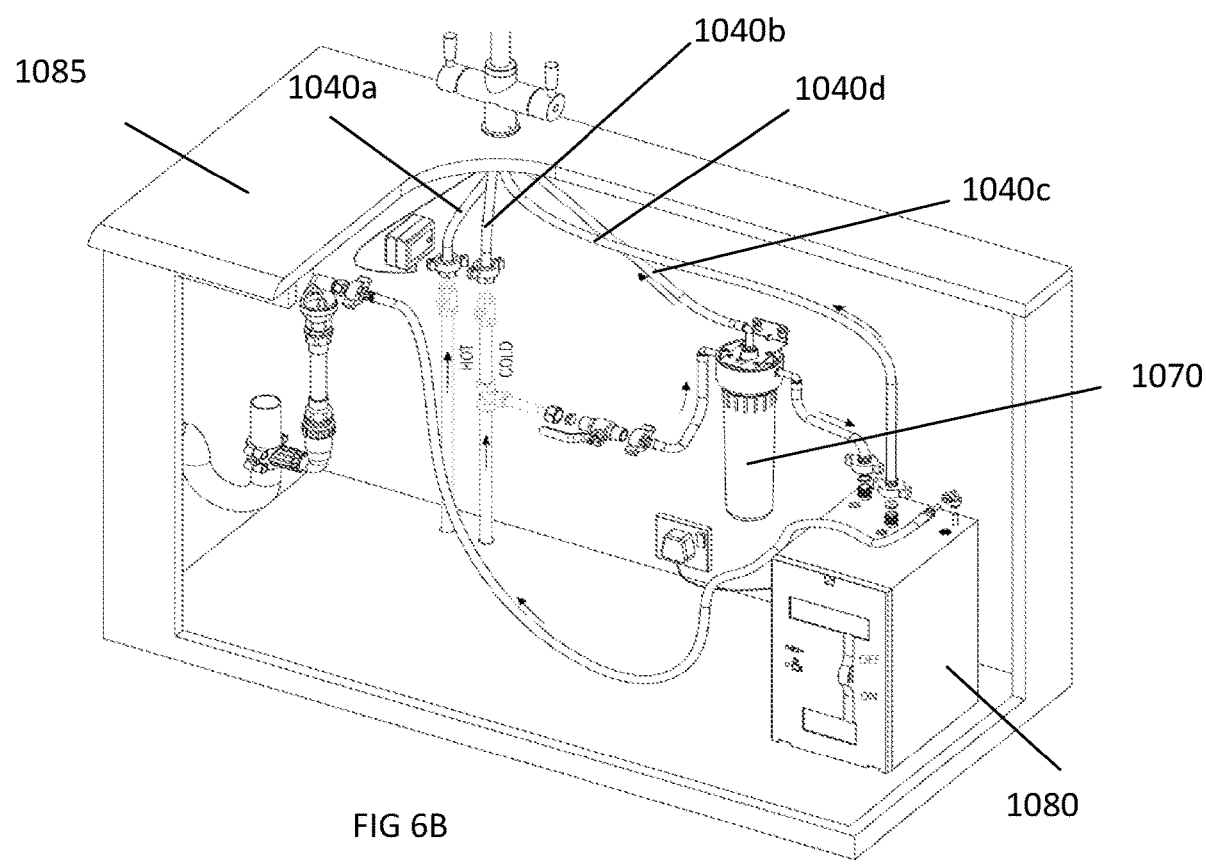
FIG. 6b is a schematic cut-away section showing the tap of FIG. 2a incorporated in a system.

Referring to FIGS. 6a and 6b, there is illustrated an example of a water tap 1000 which is a so-called "4 in 1 boiling water tap". The tap 1000 comprises a first outer body piece 1010 and a second outer body piece 1012 which are arranged substantially at right angles to one another to make a cross-shaped tap body as described above. The tap 1000 further comprises a cylindrical spout 1016 which is connected to and extends from the second outer body piece 1012. Water routes through an inner body 100 which is housed within the tap so that the first outer body piece 1010 and the second outer body piece 1012 do not come into contact with any water flowing through the tap.

The first outer body piece 1010 houses a first valve 1020 and a second valve 1022. The first valve 1020 interfaces with one side of the inner body 100 and the second valve interfaces with an opposed side of the inner body 100 that is opposite the first side. In this example, the first valve 1020 is a filtered water and boiling water selector valve which allows a user to select filtered water or boiling water but not a mixture of filtered and boiling water. The second valve is a mains hot and cold water mixer valve 1022 which allows a user to mix hot and cold water in any combination. The tap 1000 further comprises a first operating mechanism 1014 operatively connected to the first valve 1020 and a second operating mechanism 1015 operatively connected to the second valve 1022. The first and second operating mechanisms may be operated independently of one another and may be operated at the same time if required.

By activating the first operating mechanism 1014, a user can turn the tap handle to control the valve 1020 to cause water from the filtered water source or boiling water source to flow through the inner body 100 and be dispensed through an inner outlet 1018 within the spout 1016. By activating the second operating mechanism, a user can control the valve 1022 to cause water from hot and cold water sources to flow through the inner body 100 and be dispensed through an outer outlet 1017 within the spout 1016. The inner outlet 1018 is concentrically mounted within the inner outlet 1017. Such handles, their mechanism and the manner in which they control valves such as the valves 1020 and 1022 are known for example from WO2017/042586 and EP2990703 to the present applicant. The information contained in these publications is herein incorporated by reference.

As shown in FIG. 6b, four hoses 1040a, 1040b, 1040c, 1040d are provided to supply water from water sources to the inner body 100 in the tap 1000. In this example, a first hose 1040a connects the tap to a mains hot water source, a second hose 1040b connects the tap to a mains cold water source, a third hose 1040c connects the tap to a filtered water source 1070 and a fourth hose 1040d connects the tap to a boiling filtered water source 1080. The hoses may comprise a rubber (or similar flexible material) in a braided stainless steel outer (or similar more robust protective housing). Alternatively, the hoses may comprise a copper pipe onto which the connector is soldered.

The boiling water source is in the form of a boiler which has a compact design that can be easily fitted into a standard kitchen cabinet. The compact design may hold over 4 litres. The boiler is connected to a water supply and a power source. The boiler is insulated and efficient so that it uses very little power to keep the water at around 100° C. (and above 98° C.). For example, the boiler may consume less than 1 watt of electricity per hour in standby mode. The boiler operates at a minimum pressure of 1.5 bar for hot and cold supply and up to a maximum pressure of 5 bar.

Figure 7A:
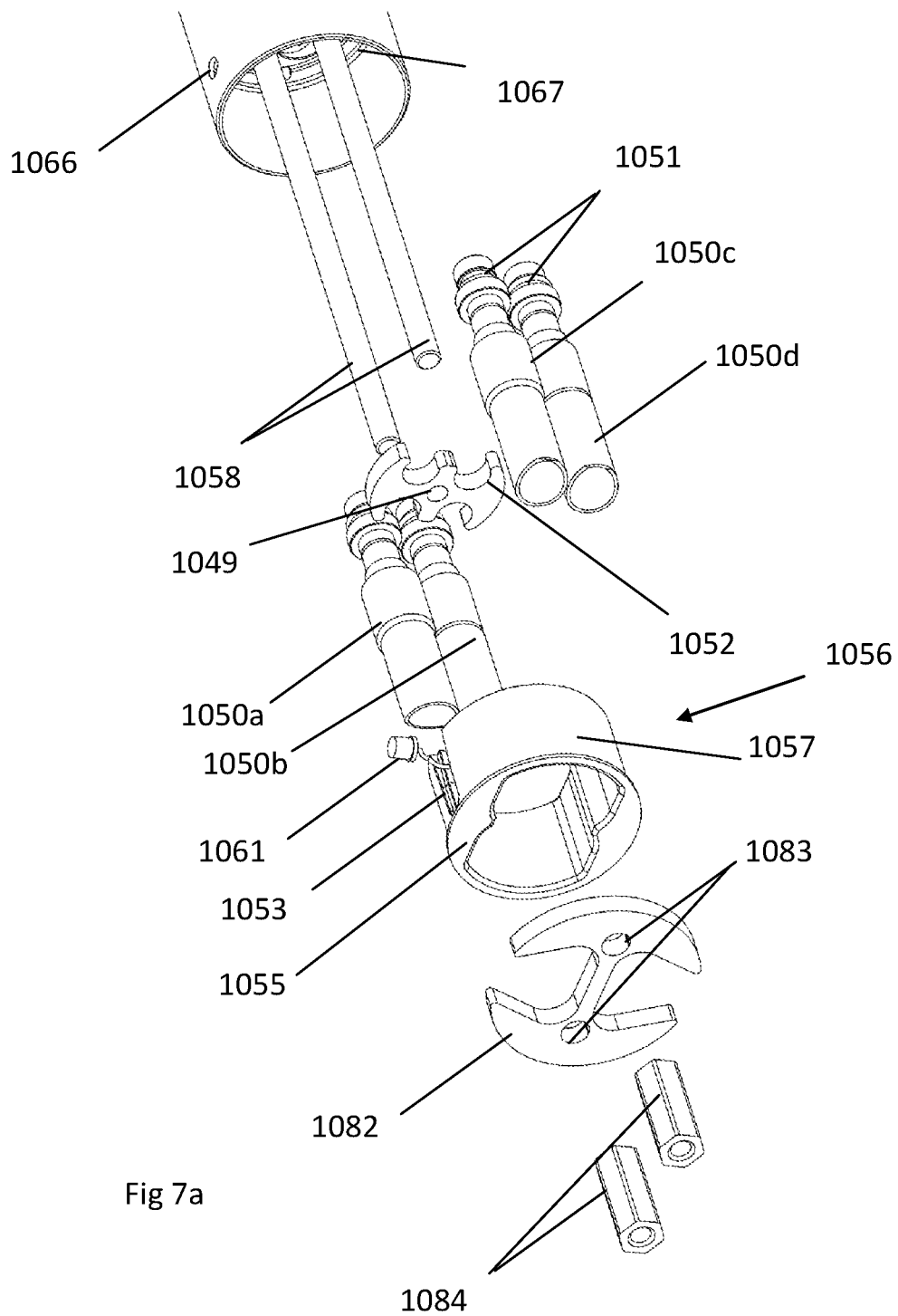
Figure 7B:
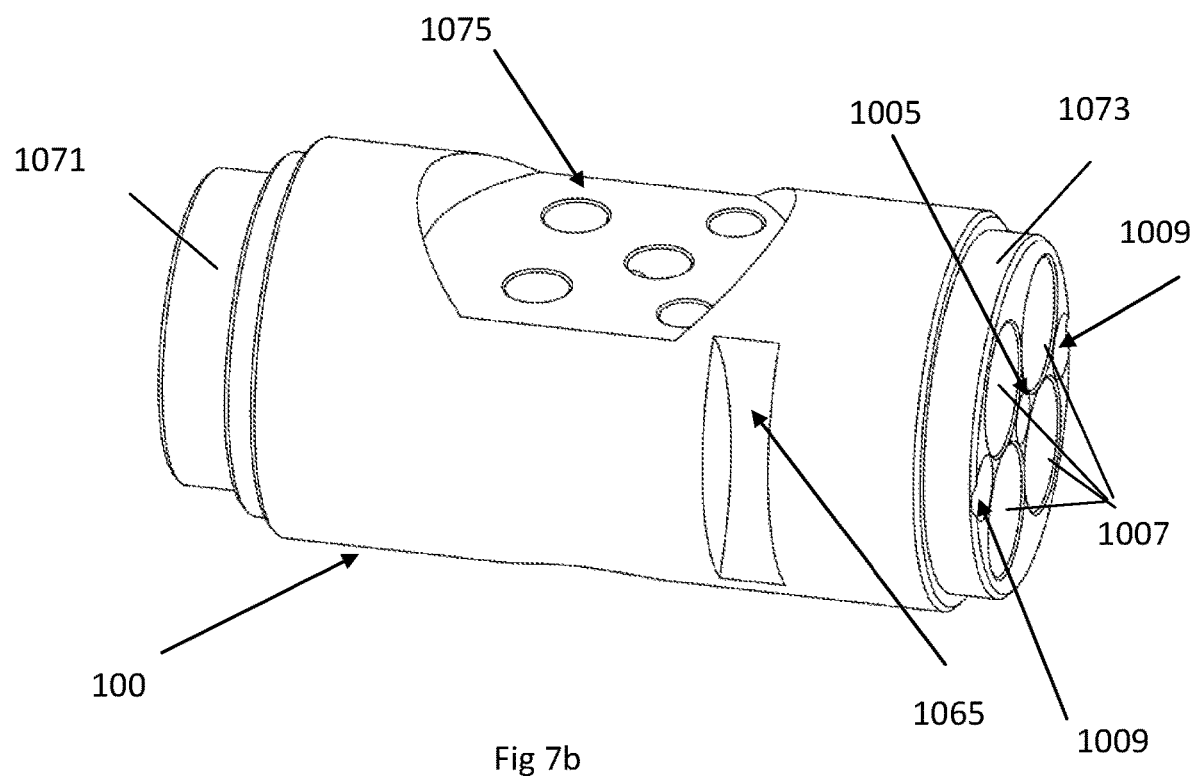

As shown in FIG. 7a, each of the four hoses has a connector 1050a, 1050b, 1050c, 1050d and each connector is releasably attached to a hose retaining member 1052. A generally cylindrical-like base insert 1056 is arranged below the hose retaining member 1052 and encircles the four hoses. Each of the connectors is received in a corresponding bore 1007 within the inner body 100 as shown in FIG. 7b. The use of non-threaded bores in the inner body 100 means that the inner body 100 can be made from materials such as plastics which are typically too weak to maintain a threaded bore. The bores and the connectors are non-threaded and the connectors are secured at least in part by a push fit. Each of the connectors comprises an O-ring 1051 which provides a seal to prevent water leaking around the outside of the hoses. The O-ring 1051 may also at least partially secure the connector in the non-threaded bore by providing an interference fit. The connectors may also be free to turn in the bores.

The hose retaining member 1052 has four slots each of which receive a connector and hold the connectors in place relative to one another to ensure accurate alignment with the bores when the connectors are inserted in the inner body 100. The hose retaining member 1052 may be secured to the inner body 100, for example, by a self-tapping screw which is received in an aperture 1049 in the hose retaining member 1052 and a corresponding bore 1005 in the base of the inner body. The hose retaining member 1052, the self-tapping screw and bore in the inner body base thus is a clamping mechanism which ensures that the connectors 1050a, 1050b, 1050c, 1050d are securely held within the non-threaded bores.

The base insert 1056 comprises a generally annular ring 1055 with a flange 1057 extending perpendicularly to the annular ring. When the base insert 1056 is inserted into the base of the tap body, the flange 1057 contacts the inner walls of the outer tap body. A slot 1053 in the flange supports an LED 1061 or similar light and the flange pushes the LED through a corresponding aperture 1066 in the outer body so that it is visible in use to a user. The LED 1061 may be used to indicate whether or not boiling water is currently available if the tap is in a "4 in 1 system". In use, the base insert 1056 rests on the work surface which holds the base insert in place. The base insert acts as a seal at the base of the tap body to reduce leakage from the tap. The height of the flange 1057 is such that the flange 1057 contacts the base of the connectors and/or the hose retaining member to help hold them in place within the non-threaded bores.

The tap (or a system incorporating the tap) also comprises a pair of elongate clamping studs 1058 which may also be used to robustly connect the inner body 100 and hence the tap to a work surface. A work surface securing member 1082 is spaced from the tap body by the height of the work surface. The securing member 1082 abuts and thus co-operates with a pair of securing nuts 1084 each of which have a threaded bore and each of which engage a respective elongate clamping stud 1058. The elongate clamping studs 1058 are screwed into the threaded bore on the securing nut 1084 to ensure a robust connection of the tap to the work surface. The use of such a work surface clamping arrangement may control the amount of force applied by a plumber when fitting the tap to the work surface and thus reduce any damage done to the connections between the connectors and the inner body or other parts of the tap during fitting.

Figure 7C:
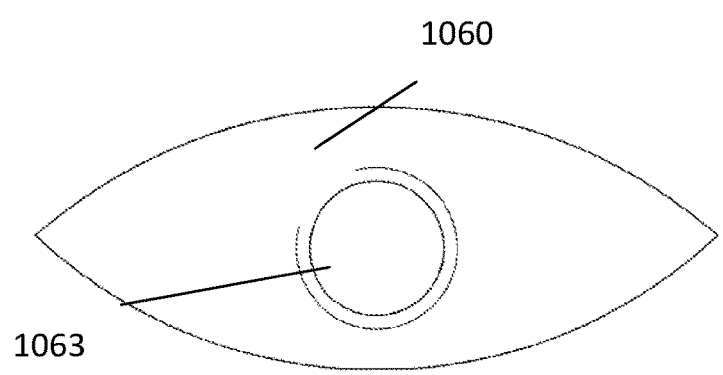
Figure 7D:
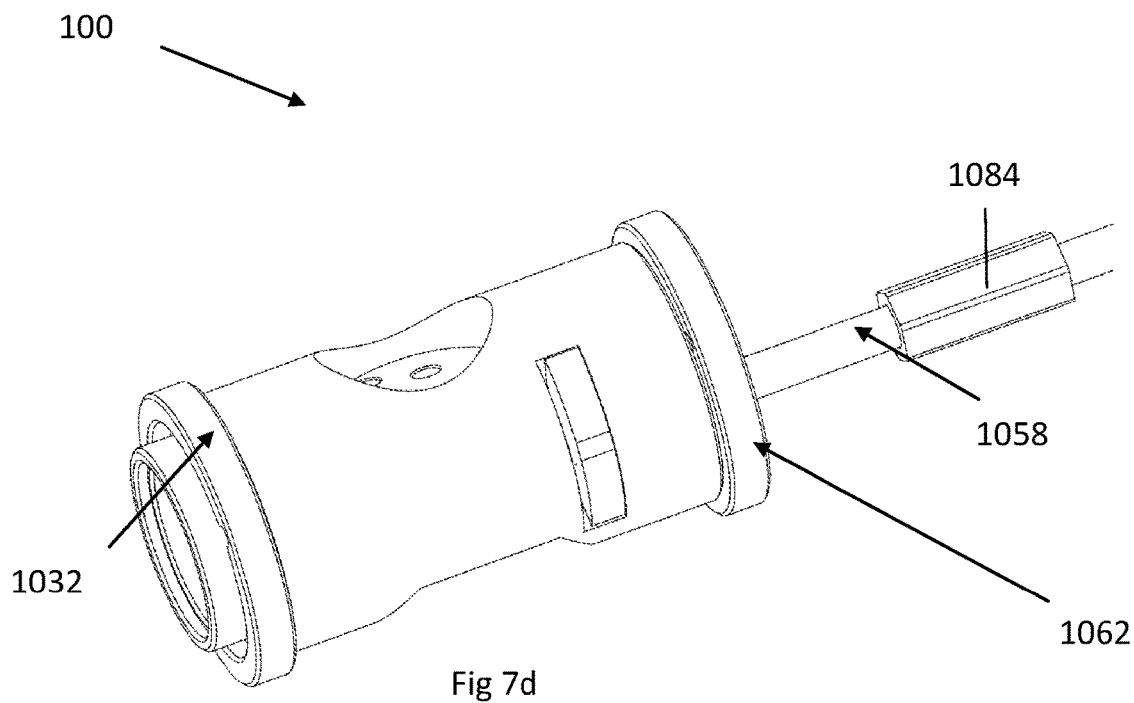

FIGS. 7b to 7d illustrate an inner body 100 which may be used in the outer body which is manufactured according to the method above. As shown in FIGS. 7b and 7d, the inner body 100 comprises a pair of indentations 1065 on opposed sides of the inner body, each of which is aligned with a non-threaded bore 1009 which receives a respective clamping stud. The non-threaded bores are on opposed sides of the inner body and do not interfere with the four non-threaded bores 1007 which each receive a connector. A central non-threaded bore 1005 is also shown in the base of the inner body for receiving the self-tapping screw. Each indentation receives a clamping insert 1060, an example of which is shown in FIG. 7c. The clamping inserts are made from metal or another material in which it is suitable to provide a threaded bore 1063. In the example shown, the clamping insert has a generally elliptical or lens-shaped cross-section. The use of a generally elliptical shape allows the insert to have the maximum surface area for distributing the load from the clamping mechanism without interfering with the internal fluid path ways. Moreover, the curved shape matches the external curvature of the inner body. Alternatively, a more standard clamping nut may be used, for example an M6 nut made of stainless steel.

In the example shown in FIGS. 7b and 7d, the clamping studs 1058 project almost one third of the way into the inner body 100. Each elongate clamping stud 1058 passes through the respective non-threaded bore 1009 and is secured in the respective clamping insert 1060 and in the respective threaded bore in the securing nut 1084. This provides a clamping mechanism for securing the tap to a work surface.

As shown in FIG. 7b, the inner body 100 has a generally cylindrical body with annular projections 1071, 1073 at opposed ends of the cylindrical body. The projections have a smaller diameter than the body. As shown in FIG. 7d, a body retaining nut 1032 slots over the upper projection 1071 to connect the inner body 100 to the second outer body 1012 at an upper end and a threaded ring 1062 slots over the lower projection to secure the inner body 100 to the second outer body 1012 at a lower end. The body retaining nut 1032 and the threaded ring 1062 are both threaded and engage with threaded bores on the inner surface of the second outer body 1010 of the tap and stabilise the inner body 100 within the outer body of the tap. The body retaining nut 1032 and the threaded ring 1062 are both generally annular. As shown in FIG. 7b, the upper projection 1071 may comprise a first portion which is enclosed by the body retaining nut 1032 and a second portion which protrudes from the body retaining nut. The second, narrower portion may abut the base of the spout and thus helps to stabilise the spout.

As shown in FIGS. 7b and 7d, the inner body 100 also comprises two generally cylindrical indentations 1075 on opposed faces. These indentations are approximately centrally mounted along the length of the inner body 100. A first indentation receives an end of the first valve and a second indentation receives an end of the second value. As best seen in FIG. 6a, the tap 1000 is provided with an O-ring 1030 between the inner body 100 and the second outer body 1012 just below the indentations 1075 to prevent water from leaking underneath a work surface in the event of a failure of one of the valves 1020, 1022.

FIG. 8 shows an alternative outer tap body which may be made using the method described above. In this example, visual indicators 68 are included, e.g. etched or otherwise patterned on the first body part 120. The visual indicators show the direction of rotation to dispense boiling water and filtered water respectively. It will be appreciated that these are merely indicative and other visual indicators may be used.

FIG. 9a shows a first body part 120 which may be manufactured in the process above. Many features are common to the first body parts described above and thus similar reference numbers have been used. As in the previous arrangements, the first body part 120 is a generally cylindrical and hollow tube with opposed open ends 124. An outer open end 124 has a screw thread 126 which may be used to fit other components, e.g. a cover or handle boss for the tap. There is also an opposed pair of apertures 122 but in contrast to the previous arrangements, the apertures 122 are generally located towards the opposed open end to the open end, i.e. towards the inner end. Each aperture is generally circular with a diameter approximately equal to the diameter of the cylinder.

FIG. 9b shows a second body part 130 which may be manufactured in the process above. Many features are common to the first body parts described above and thus similar reference numbers have been used. As in the previous arrangements, the second body part 130 is a generally cylindrical and hollow tube with opposed open ends 134. An upper open end 134 is capped with a cap 136, as described above. In contrast to the previous arrangements, there is a single aperture 132 which is generally centrally located on the tube. Each aperture is generally circular.

FIG. 9c shows the first body part 120 of FIG. 9a inserted into the single aperture 132 on the second body part 130 of FIG. 9b. The two parts together make an outer tap body having a T-shape with the first body part 120 generally at right angles to the second body part 130. Once inserted, the apertures on the first body part 120 are aligned with the open ends of the second body part 130 so that there is a continuous channel through the first and second body parts. One end of the first body part 120 contacts the inner surface of the second body part 130.

As shown in FIG. 9d, the open end of the first body part 120 which is adjacent the apertures 122 is curved or otherwise shaped to match the inner surface of the second body part against which it abuts. Additionally, as shown in FIG. 9e, the use of an open end adjacent the apertures 122 results in an open end which contacts the inner surface of the second body only around the perimeter 123 of the open end.

FIG. 9f illustrates an example of a water tap 2000 which incorporates the first and second body parts above. The tap 2000 comprises a first outer body piece 2010 and a second outer body piece 2012 which are arranged substantially at right angles to one another to make a T-shaped tap body as described above. The tap 2000 further comprises a cylindrical spout 2016 which is connected to and extends from the second outer body piece 2012. Water routes through an inner body 200 which is housed within the tap so that the first outer body piece 2010 and the second outer body piece 2012 do not come into contact with any water flowing through the tap.

The first outer body piece 2010 houses a valve 2020 which interfaces with one side of the inner body 200. In this example, the valve 2020 is a filtered water and boiling water selector valve which allows a user to select filtered water or boiling water but not a mixture of filtered and boiling water. However, it may be any type of valve, e.g. a mains hot and cold water mixer valve. The tap 2000 further comprises a lever operating mechanism 2014 operatively connected to the valve 2020. By activating the operating mechanism 2014, a user can turn the tap to cause water from the filtered water source or boiling water source to flow through the inner body 200 and be dispensed through an inner outlet 2018 within the spout 2016. In use, the tap 2000 is fixed to a work surface using the clamping rod 2022, clamping nuts 2023 and clamping plate 2024 which sits below the work surface.

The above embodiments are to be understood as illustrative examples of the invention. Further embodiments of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A method of manufacturing a tap outer body comprising
    making first and second hollow body parts, wherein the first body part is of unitary construction and comprises a first pair of apertures and the second body part is of unitary construction and comprises opposed open ends and at least one aperture between the opposed open ends;
    inserting the first body part into the at least one aperture of the second body part to make a tap outer body; and
    aligning the first pair of apertures of the first body part with the opposed open ends of the second body part to define a channel through the tap outer body.

2. The method of claim 1, further comprising patterning at least one of the first and second body parts before the inserting of the first body part.

3. The method of claim 2, wherein the patterning comprises patterning at least part of an outer surface of the second body part.

4. The method of claim 2, wherein the patterning comprises repeatedly patterning a single design.

5. The method of claim 2, wherein the patterning is laser etching.

6. The method of claim 1, wherein the making of the first body part comprises creating the first pair of apertures approximately mid-way along the first body part.

7. The method of claim 1, wherein the making of the first body part comprises creating the first pair of apertures adjacent one end of the first body.

8. The method of claim 7,
    wherein the making of the first body part comprises shaping the adjacent one end to match an inner surface of the second body part, and
    wherein the inserting of the first body part comprises inserting the first body part so that the shaped adjacent one end abuts the inner surface of the second body part.

9. The method of claim 1, wherein the making of the first body part comprises creating the first pair of apertures each with a width which is approximately equal to a width of the second body part.

10. The method of claim 1, wherein the making of the second body part comprises creating the at least one aperture with a width which is approximately equal to a width of the first body part.

11. The method of claim 1, wherein the at least one aperture comprises a second pair of apertures.

12. The method of claim 11, wherein the inserting of the first body part comprises inserting the first body part through both of the second pair of apertures so that, after the insertion, the first body part is substantially at right angles to the second body part.

13. A tap outer body comprising:
    a first one-piece hollow body part comprising a first pair of apertures; and a second one-piece hollow body part comprising opposed open ends and at least one aperture between the opposed open ends,
wherein the first body part is located in the at least one aperture of the second body part, and
wherein the first pair of apertures of the first body part are aligned with the opposed open ends of the second body part, and the aligned first pair of apertures define a channel through the tap outer body.

14. The tap outer body of claim 13, wherein one of the opposed open ends is connectable to a spout of a tap.

15. The tap outer body of claim 13, wherein the first pair of apertures are located approximately mid-way along the first body part.

16. The tap outer body of claim 13, wherein the first pair of apertures is adjacent one end of the first body part.

17. The tap outer body of claim 16, wherein the adjacent one end has a shape that matches an inner surface, of the second body part, that abuts the adjacent one end.

18. The tap outer body of claim 13, wherein each aperture in the first pair of apertures has a width which is approximately equal to a width of the second body part.

19. The tap outer body of claim 13, wherein the at least one aperture has a width which is approximately equal to a width of the first body part.

20. The tap outer body of claim 13, wherein the at least one aperture is a second pair of apertures.

21. The tap outer body of claim 13, wherein the first body part is set substantially at right angles to the second body part.

22. The tap outer body of claim 13, wherein at least one of the first and second body parts is patterned.

* * * * *